United States Patent
Eleftheriadis et al.

(10) Patent No.: US 12,127,114 B2
(45) Date of Patent: Oct. 22, 2024

(54) METHOD FOR IMPROVING BASE STATION EFFICIENCY AND POWER CONSUMPTION

(71) Applicant: Telefonaktiebolaget LM Ericsson (publ), Stockholm (SE)

(72) Inventors: Lackis Eleftheriadis, Gävle (SE); Adam Bergkvist, Luleå (SE); Bin Sun, Luleå (SE); Marin Orlic, Bromma (SE); Athanasios Karapantelakis, Solna (SE); Yang Zuo, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 520 days.

(21) Appl. No.: 17/612,340

(22) PCT Filed: May 29, 2019

(86) PCT No.: PCT/EP2019/063942
§ 371 (c)(1),
(2) Date: Nov. 18, 2021

(87) PCT Pub. No.: WO2020/239213
PCT Pub. Date: Dec. 3, 2020

(65) Prior Publication Data
US 2022/0248324 A1    Aug. 4, 2022

(51) Int. Cl.
*H04W 52/02* (2009.01)
*H02J 1/10* (2006.01)

(52) U.S. Cl.
CPC ......... *H04W 52/0206* (2013.01); *H02J 1/109* (2020.01)

(58) Field of Classification Search
CPC .......................... H04W 52/0206; H02J 1/109
See application file for complete search history.

(56) References Cited

U.S. PATENT DOCUMENTS

2006/0181153 A1* 8/2006 Oberle .................... H02J 9/062
307/112
2008/0246338 A1* 10/2008 Donnelly .................. B61C 7/04
307/53

* cited by examiner

*Primary Examiner* — Justin Y Lee
(74) *Attorney, Agent, or Firm* — COATS & BENNETT, PLLC

(57) ABSTRACT

The present disclosure relates to a method of controlling power supply units (1-9) of a base station (10), and a device (20) performing the method. In an aspect, a method of a base station scheduling device (20) of controlling power supply units (1-9) of a base station (10) is provided. The method comprises acquiring (S102*a-c*) information indicating a value of voltage input to at least one of the power supply units (1-9) of the base station (10), determining (S103) from said value if the voltage input to said at least one of the power supply units (1-9) is sufficient, and if not determining (S104) power demand of the base station (10), and deactivating (S105) said at least one power supply unit, if remaining power supply units (1-9) is capable of supplying the demanded power.

20 Claims, 3 Drawing Sheets

METHOD FOR IMPROVING BASE STATION EFFICIENCY AND POWER CONSUMPTION

TECHNICAL FIELD

The present disclosure relates to a method of controlling power supply units of a base station, and a device performing the method.

BACKGROUND

In today's radio access networks, energy consumption of a radio base station (RBS) is of high importance, and new ways to improve efficiency and to lower the energy consumption of a base station, or even a data centre, are needed.

A base station is equipped with a plurality of Power Supply Units (PSUs) operating to maintain, control and stabilize the −48 V direct current (DC) system voltage to the consumers via baseband or radio.

A base station is typically equipped with 3 to 9 PSUs to handle the total power demand of the base station and to stabilize the −48 VDC voltage based on the power consumed by the users, without taking into account variations occurring in alternating current (AC) voltage being input to the PSUs (i.e. AC grid power line input voltage), which AC voltage may be anywhere in the range of 200 VAC to 250 VAC during normal operation.

SUMMARY

An objective is to solve, or at least mitigate, the problem in the art of varying input voltages to the PSUs and to provide a method of controlling power supply units of a base station.

This objective is attained in a first aspect of the invention by a of base station scheduling device of controlling power supply units of a base station. The method comprises acquiring information indicating a value of voltage input to at least one of the power supply units of the base station, determining from said value if the voltage input to said at least one of the power supply units is sufficient, and if not determining power demand of the base station, and deactivating said at least one power supply unit, if remaining power supply units is capable of supplying the demanded power.

This objective is attained in a second aspect of the invention by a base station scheduling device configured to control power supply units of a base station. The base station scheduling device comprises a processing unit and a memory, said memory containing instructions executable by said processing unit, whereby the base station scheduling device is operative to acquire information indicating a value of voltage input to at least one of the power supply units of the base station, determine from said value if the voltage input to said at least one of the power supply units is sufficient, and if not to determine power demand of the base station and deactivate said at least one power supply unit, if remaining power supply units is capable of supplying the demanded power.

Advantageously, by taking into account voltage—actual voltage or predicted voltage—supplied to each PSU and by controlling the operation of one or more PSUs being connected to a line input voltage considered to be insufficient by deactivating such a PSU, i.e. by temporarily setting the PSU in idle mode or even turning the PSU off, as long as the remaining PSUs are capable of supplying the power required by the RBS, the variations in line input voltage are mitigated.

In an embodiment, the value of inputted voltage is considered to be sufficient if the value exceeds an input voltage threshold value.

In an embodiment, a request is further sent to the base station to receive the value of voltage input to at least one of the power supply units of the base station, which value is measured at the base station.

In an embodiment, the acquiring of the information comprises receiving a value of voltage input to at least one of the power supply units of the base station, which value is measured at the base station, on a regular basis.

In an embodiment, the deactivating of said at least one power supply unit comprises turning said at least one power supply unit off or setting the said at least one power supply unit in idle mode.

In an embodiment, information indicating a new value of voltage input to said at least one of the power supply units of the base station is acquired and it is determined from said new value if the voltage input to said at least one of the power supply units is sufficient, and if so said at least one power supply unit is reactivated.

In an embodiment, the acquiring of information indicating a value of voltage input to at least one of the power supply units of the base station comprises estimating said value based on historical data indicating said value at a particular time of day.

In an embodiment, the determining of power demand of the base station comprises estimating said power demand based on historical data indicating said power demand at a particular time of day.

In a third aspect, a computer program comprising computer-executable instructions for causing a base station scheduling device to perform the method of the first aspect is provided when the computer-executable instructions are executed on a processing unit included in the base station scheduling device.

In a fourth aspect, a computer program product comprising a computer readable medium is provided, the computer readable medium having the computer program according to the third aspect embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
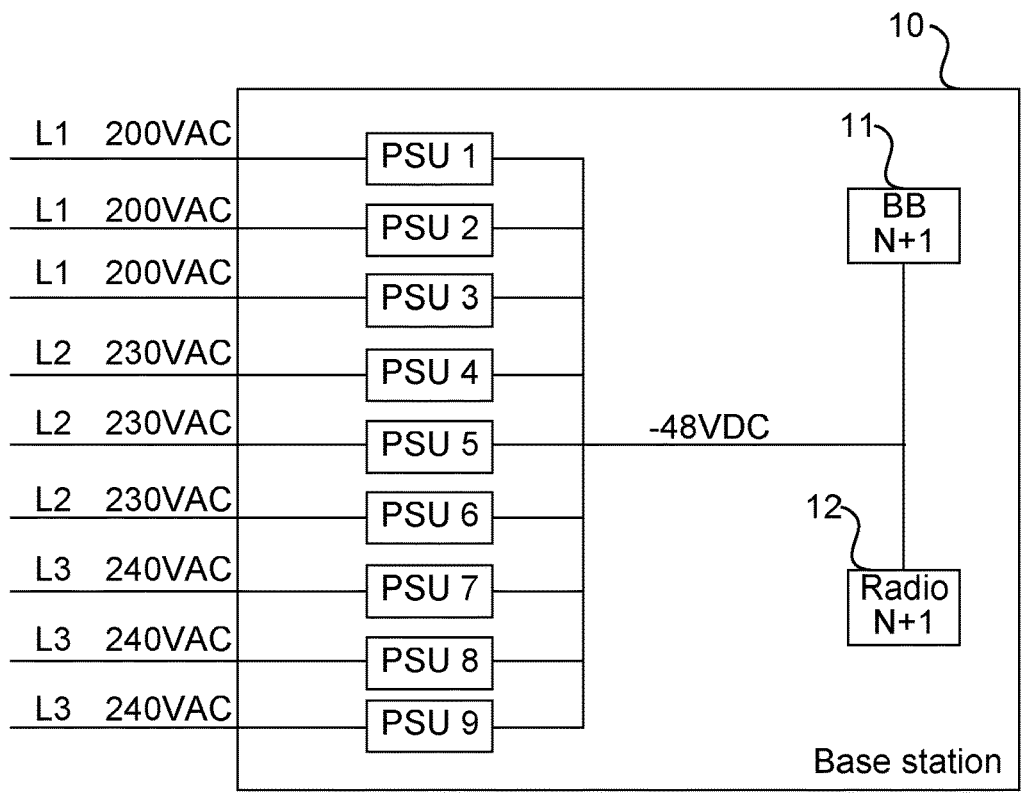
FIG. 1 illustrates a base station in which embodiments may be implemented.

FIG. 1 illustrates a base station 10 in which embodiments may be implemented. As can be seen, the radio base station 10 is equipped with nine PSUs 1-9 for supplying the base station 10 with power. As is shown, the base station 10 may comprise for instance one or more baseband units 11 and one or more radio units 12 which need to be supplied with power via a −48 VDC voltage. As is understood, FIG. 1 is used for illustrative purposes only, and a base station generally comprises a large number of components requiring power supply.

In this exemplifying embodiment, the first three PSUs 1-3 are supplied with power from a first AC line input L1—commonly referred to as a powerline—delivering a voltage of 200 VAC, while a second group of PSUs 4-6 are supplied with power from a second AC line input L2 delivering a voltage of 230 VAC, and the last three PSUs 7-9 are supplied with power from a third AC line input L3 delivering a voltage of 240 VAC.

The PSUs 1-9 inside the RBS 10 are modularized to be able to be reconfigured depending on the maximum power that will be required in the RBS 10 including battery backup. The modularization depends on the RBS cabinet capacity, and can be configured with different PSU capacity, e.g. a PSU capacity of 1 KW, 1.8 KW, 2 KW or 2.7 KW.

One reason that the AC line voltages of the powerlines L1, L2 and L3 vary and occasionally are low at the input to the RBS 10 is that the AC line voltages are heavily loaded by other devices along the power grid transmission line to which the powerlines are connected, which is outside of the control of the RBS 10.

When the AC line voltage becomes too low, e.g. around 200 VAC as indicated at the first AC line input L1, the PSUs 1-3 connected to the line voltage will not operate efficiently. To improve efficiency of a PSU, it will typically have to be operated at nominal voltage, i.e. at around 230 VAC.

With fifth generation (5G) radio units added to existing radio network infrastructures, total power consumption of a radio site will increase. Therefore, new methods to improve end-to-end (e2e) energy efficiency thereby reducing the power consumption are highly needed.

Figure 2:
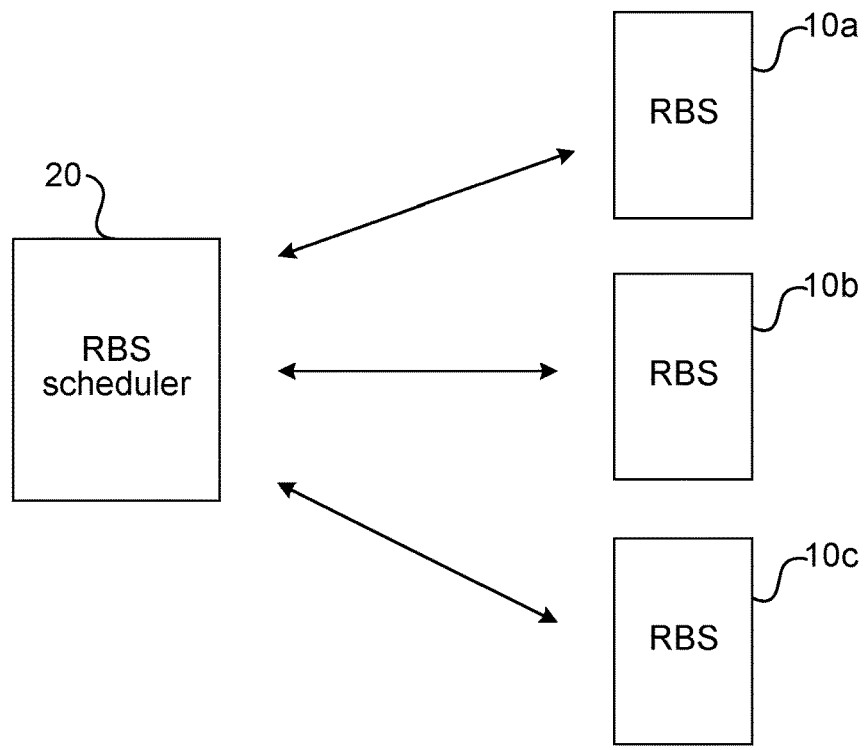
FIG. 2 illustrates a radio access network site comprising a plurality of RBSs being coordinated by an RBS scheduler having access to information indicating power demand information of the RBSs.

FIG. 2 illustrates a radio access network site comprising a plurality of RBSs 10a, 10b, 10c. In order to control the PSUs of each RBS 10a, 10b, 10c, a coordinating device is required, embodied for instance in the form of an RBS scheduler 20 which is capable of taking into account power demand of the RBSs 10a, 10b, 10c to be controlled, as well as the power demand of other potential RBSs and equipment in the radio access network.

Figure 3:
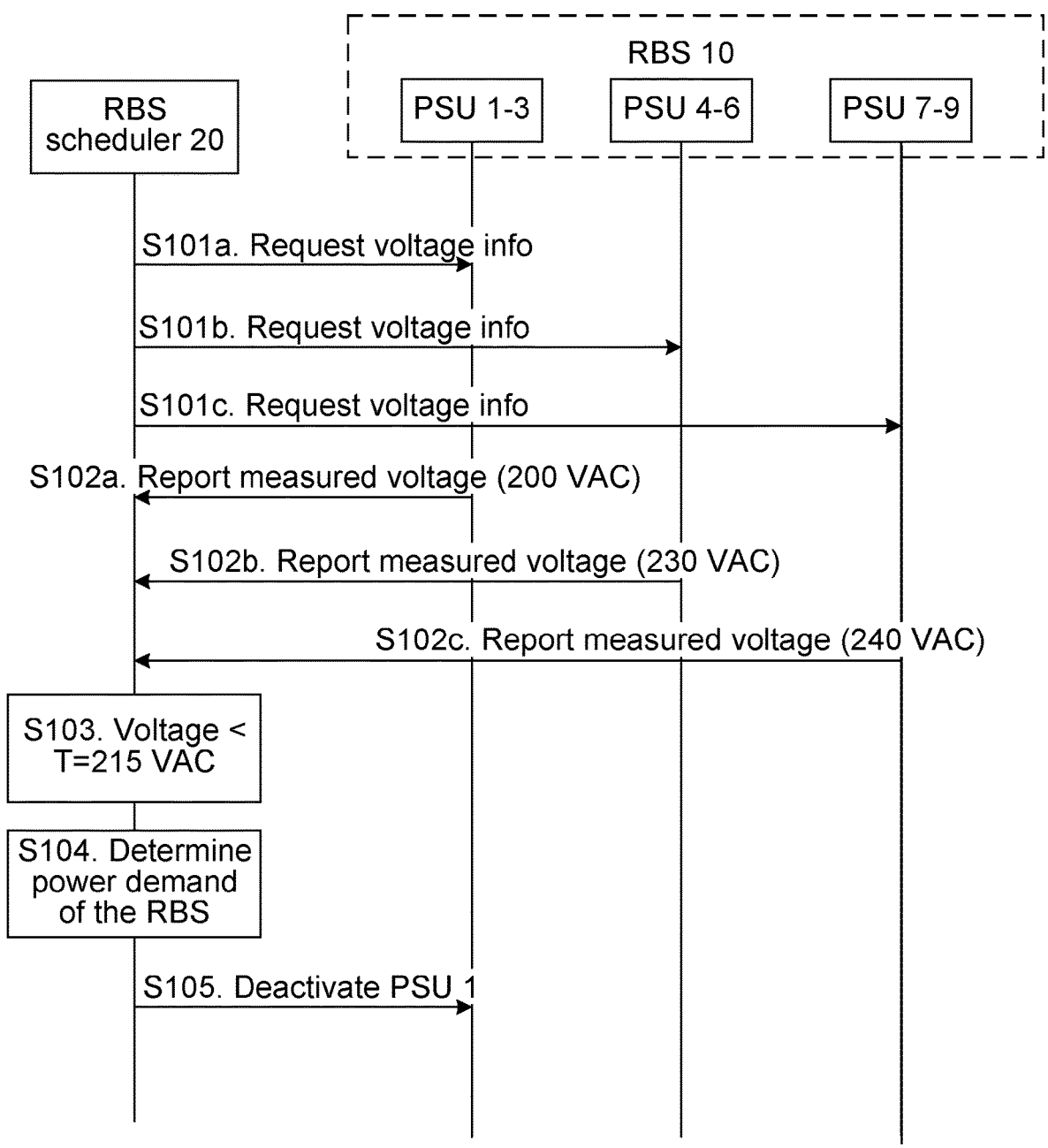
FIG. 3 shows a signalling diagram illustrating a method of controlling power supply units of, and thus power supplied to, the RBS of FIG. 1 according to an embodiment.

FIG. 3 shows a signalling diagram illustrating a method of controlling power supply units of, and thus power supplied to, the RBS 10 of FIG. 1 according to an embodiment. Initially, the RBS scheduler 20 acquires information indicating a value of voltage being input to at least one of the PSUs 1-9 of the RBS 10. As illustrated in FIG. 2, a number of RBSs may be controlled simultaneously by the RBS scheduler 20. It should further be noted that the RBS scheduler 20 not necessarily acquires information indicating a value of voltage actually being input to at least one of the PSUs 1-9 of the RBS 10, but may alternatively acquire an estimate of the voltage to be, or being, input.

In this exemplifying embodiment, the RBS scheduler 20 sends a request to the RBS 10 to receive the information. However, it may also be envisaged that the RBS 10 itself reports the information to the RBS scheduler 20 on a more or less regular basis, without the RBS scheduler 20 having to request the information.

In this example, a first instruction is sent in step 11a to one or more of the PSUs 1-3 connected to AC line input L1 to measure voltage at L1, a second instruction is sent in step 101b to one or more of the PSUs 4-6 connected to AC line input L2 to measure the voltage at L2, and a third instruction is sent in step 101c to one or more of the PSUs 7-9 connected to AC line L3 to measure the voltage at L3. As is understood, the instructions are sent to the RBS 10 which internally instructs the PSUs to provide the requested information As a result of receiving the instruction, the first PSU 1 measures the voltage at powerline L1 and returns the measured L1 voltage value to the RBS scheduler 20 in step S102a, the fourth PSU 4 measures the voltage at line input L2 and returns the measured L2 voltage value to the RBS scheduler 20 in step S102b, and the seventh PSU 7 measures the voltage at line input L3 and returns the measured L3 voltage value to the RBS scheduler 20 in step S102c.

Now, assuming that an AC line voltage threshold value T is set to e.g. 215 VAC, and that the RBS scheduler 20 will consider turning one or more PSUs off (e.g. a longer shutdown) or temporarily setting the PSUs in an idle mode (i.e. first a short time in idle, and then turn the PSUs off), in a scenario where these one or more PSUs are supplied with an AC line voltage being below the AC line voltage threshold value T, given that an expected power demand of the RBS 10 still can be satisfied by the remaining PSUs.

The first PSU 1 will thus report in step S102a to the RBS scheduler 20 that the voltage at the first AC line input L1 is measured to be 200 VAC, while the fourth PSU 4 reports in step S102b that the voltage at the second AC line input L2 is measured to be 230 VAC and the seventh PSU 7 reports in step S102c that the voltage at the third AC line input L3 is measured to be 240 VAC.

The RBS scheduler 20 will determine in step S103 that the first three PSUs 1-3 are supplied with an AC line voltage at line input L1 which currently is below the exemplifying AC line voltage threshold value T (T=215 VAC), while the AC line voltages at L2 and L3 are above the threshold value T. Hence, the RBS scheduler 20 concludes in step S103 that the voltage being input to the first three PSUs 1-3 not is sufficient according to the predetermined criteria that the AC line input voltage should be at least 215 VAC for a PSU to operate in an efficient manner.

Since an AC line voltage supply below the threshold value T will lead to inefficient operation of any PSU being supplied with such AC line voltage, the RBS scheduler 20 will determine whether or not one or more of the PSUs 1-3 connected to L1 can be deactivated, i.e. turned off or set in idle mode, while the remaining PSUs still can supply the RBS 10 with sufficient power according to the power demand of the RBS 10. Setting a PSU in idle mode may imply that the output voltage of the PSU is set to a low voltage, but still above zero voltage.

Thus, following step S103, the RBS scheduler 20 determines in step S104 power demand of the RBS 10. This may be performed by having the RBS scheduler 20 estimate the power demand, but it may alternatively be envisaged that the RBS scheduler 20 indeed knows the power demand of the RBS 10.

Assuming for instance that each of the 9 PSUs is capable of delivering a power of 1.8 kW (i.e. in total 9×1.8=16.2 kW), and that total power demand of the RBS 10 is 14 kW. If so, one of the PSUs can be turned off since the remaining PSUs still have the capacity to deliver the power demanded by the RBS 10.

Thus, the RBS scheduler 20 sends an instruction to the RBS 10 in step S105 to turn e.g. the first PSU 1 off. With the first PSU 1 being turned off, the remaining PSUs 2-9 are capable of delivering 16.2−1.8=14.4 kW, which still is sufficient power since the power demand of the RBS 10 is 14 kW.

As can be concluded, it would not have been possible to further turn off e.g. the second PSU 2, since the capacity of the remaining PSUs 3-9 would drop to 14.4−1.8=12.6 W, which is below the power level required by the RBS 10.

Advantageously, the embodiment described with reference to FIG. 3 takes into account the AC line input voltage to each PSU and controls the operation of one or more PSUs being connected to an AC line input voltage considered to be insufficient by deactivating such a PSU, i.e. by setting the PSU in temporary idle mode or even turning the PSU off, as long as the remaining PSUs are capable of supplying the power required by the RBS.

Again, with reference to FIG. 1 and FIG. 3; assuming that the first three PSUs 1-3 each deliver 1 kW of power to the RBS 10, and that the remaining six PSUs 4-9 each deliver 1.8 kW while the power demand of the RBS 10 amounts to 10 kW. In such a scenario, where all three PSUs 1-3 are supplied from the first AC line voltage input L1, they may all be deactivated, since the remaining six PSUs 4-9 still are capable of delivering a total power of 1.8×6=10.8 kW.

Figure 4:
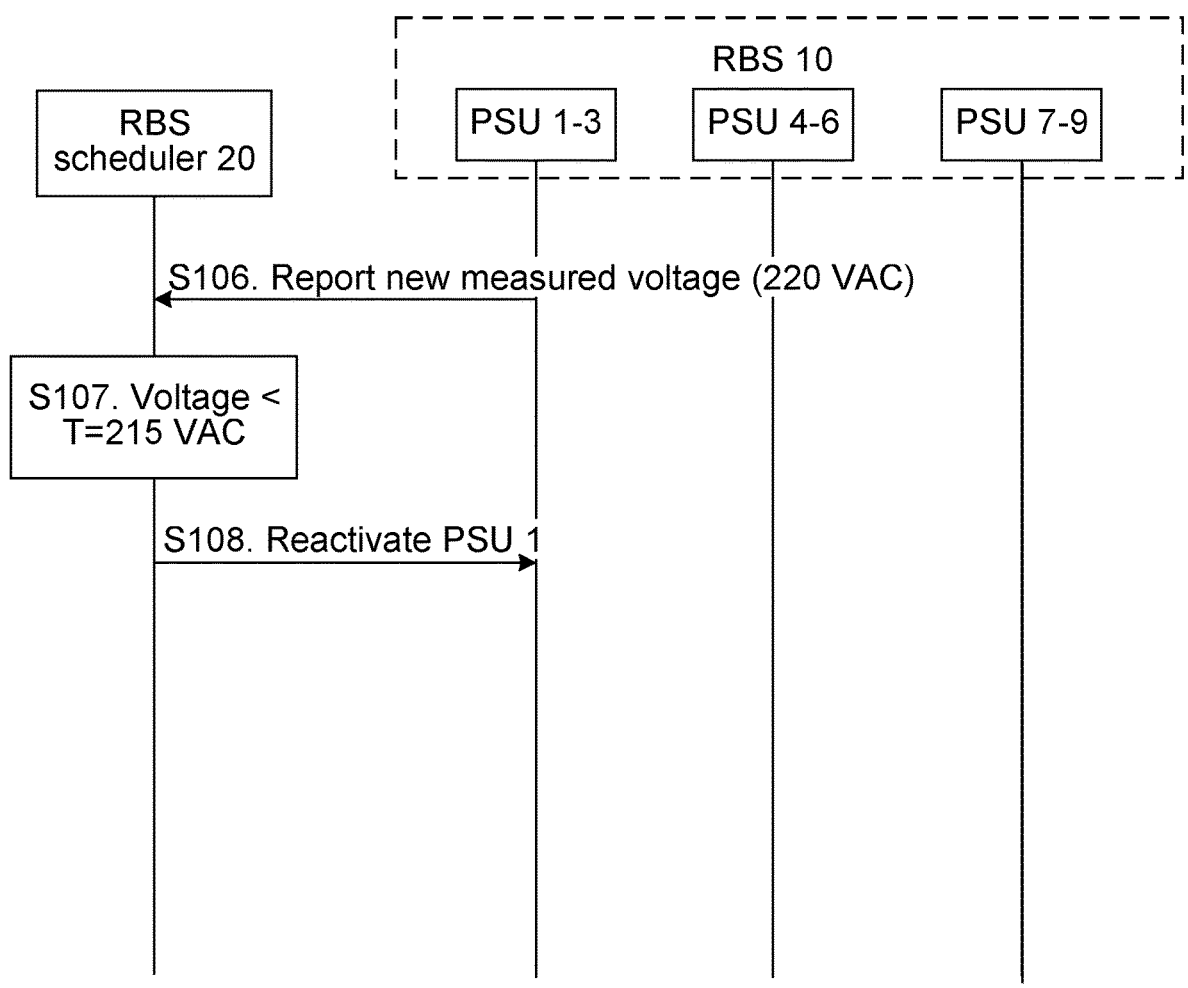
FIG. 4 shows a signalling diagram illustrating a method of controlling power supply units of, and thus power supplied to, the RBS of FIG. 1 according to a further embodiment.

FIG. 4 shows a signalling diagram illustrating a method of controlling power supply units of, and thus power supplied to, the RBS 10 of FIG. 1 according to a further embodiment.

After having deactivated the first PSU 1 in step S105 of FIG. 3, the RBS scheduler 20 acquires information indicating that the voltage of the first AC line input L1 now is at 220 VAC. The RBS scheduler 20 may send a request for such information as shown in FIG. 3. However, it may also be envisaged that the RBS 10 frequently reports such information to the RBS scheduler 20, or that the RBS 10 reports such information when an AC line input voltage having been below T=215 VAC rises above T.

The RBS scheduler 20 advantageously concludes in step S107 that the voltage of the first AC line input L1 is 220 VAC, i.e. above T=215 VAC, and thus sends an instruction to the RBS 10 in step S108 that the first PSU 1 should be reactivated.

As shown in FIGS. 3 and 4, the RBS scheduler 20 acquires a value of the voltages of the AC line inputs L1, L2, L3 by receiving actually measured values from the RBS 10. However, it may also be envisaged that the RBS scheduler 20 acquires such information using machine learning and/or statistical data.

A machine learning method may be used to forecast the AC line input voltage of an individual PSU over time. For instance, measurements of AC line input voltages may be performed such that statistical data advantageously can be applied.

For instance, the actual AC line input voltage of a particular PSU may be measured, say, each minute or each five or ten minutes. Hence, such a data set would include the voltage value as well as time of day and date of the measurement.

The RBS scheduler 20 would thus advantageously be able to estimate the AC line input voltage of a particular PSU at a certain time of day. Further, the data set may be complemented with a probability indicating certainty of the measured voltage value being correct, since there may be a variation in the measured voltages values for the same time of day.

Hence, the estimation of the AC line input voltages of the PSUs 1-9 may be based on statistical data, since the behaviour of the power grid may vary for different days (e.g. weekdays or weekends) but also over holidays (e.g. summer or winter vacation, public holidays). A simple classification decision tree can be used in this case to direct a newly-recorded input voltage to a proper class (i.e. leaf of the decision tree), where exemplary classes could be different weekdays since the AC line input voltage may vary for each day.

For instance, Sundays have higher load than Saturdays, implying that the power demand is higher on Sundays than on Saturdays, while Wednesdays typically have two distinct load peaks.

From the data points in the classes of the decisions tree, variation of the AC line input voltages may be estimated. This may be performed in a number of ways, two of which are outlined in the following:

In a first approach, statistical tools are utilized based on the following aspects:

Stability of AC line input voltage, where stability may be defined as deviation from an average value over a certain time period. As stability is similar to statistical dispersion of sampled input voltage values over time, several statistical tools can be used to measure stability, for example standard deviation or median absolute deviation.

Average value of AC line input voltage: the value of the input voltage (arithmetic mean) over a certain time period.

In this approach, the standard deviation of the voltage for each class is computed, as well as the mean voltage for the respective class. This may be further complemented by calculating the standard deviation for distinct points in time (e.g. last month, last year, last week, etc.), take the average of standard deviations, and apply a weighting factor for data further back in time, in order to provide higher accuracy. If for instance the mean voltage is below a threshold and/or the standard deviation is too high, the associated PSU is a candidate for deactivation.

In a second approach, regression is utilized to learn the variation of AC input line voltage for every powerline (denoted L1, L2 and L3 in FIG. 1) of the power grid and thereafter a model is built for each PSU-power line pair. The model is used to estimate AC line input voltages for individual PSUs over time. If the estimated AC line input voltage is lower than a threshold, the associated PSU s deemed to be a candidate for deactivation.

In addition to the statistical data parameters mentioned above which may be considered for determining AC line input voltage, such as time and date, other data can be used to improve the accuracy of the predictions. These can be divided into two categories; parameters that affect the radio load on the site, and features that affect the stability of the power grid voltage. One example from the first category is information about non-recurring events that temporarily gathers a great deal of people such as conferences and fairs. Parameters from the second category includes weather information such as forecasts, warnings about dry periods and upcoming storms. Further, particulars about the power grid provider may be taken into account.

In an embodiment, not only the AC line input voltage of an individual PSU may be forecasted over time using machine learning; this is also applicable to the determining of the power demand of an RBS. Advantageously, the RBS scheduler 20 may take into account the time of day when estimating the power demand, or temporary load-inducing events such as conferences, fairs and sport events.

Figure 5:
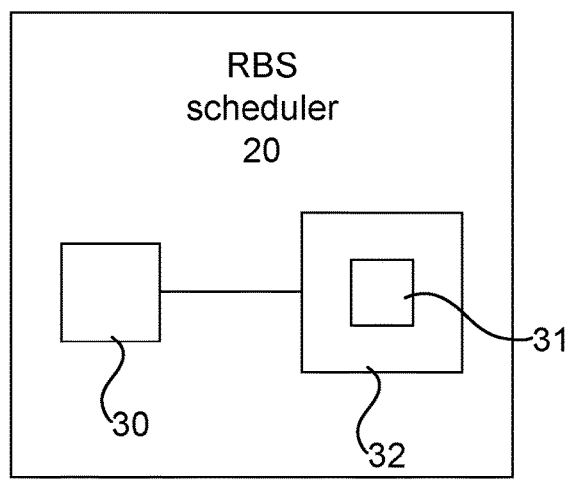
FIG. 5 illustrates an RBS scheduler according to an embodiment

FIG. 5 illustrates an RBS scheduler 20 according to an embodiment. The steps of the method performed by the RBS scheduler 20, being embodied e.g. in the form of a computer or server, of controlling power supply units of a base station according to embodiments are in practice performed by a processing unit 30 embodied in the form of one or more microprocessors arranged to execute a computer program 31 downloaded to a suitable storage volatile medium 32 associated with the microprocessor, such as a Random Access Memory (RAM), or a non-volatile storage medium such as a Flash memory or a hard disk drive. The processing unit 30 is arranged to cause the RBS scheduler 20 to carry out the method according to embodiments when the appropriate computer program 31 comprising computer-executable instructions is downloaded to the storage medium 32 and executed by the processing unit 30. The storage medium 32 may also be a computer program product comprising the computer program 31. Alternatively, the computer program 31 may be transferred to the storage medium 32 by means of a suitable computer program product, such as a Digital Versatile Disc (DVD) or a memory stick. As a further alternative, the computer program 31 may be downloaded to the storage medium 32 over a network. The processing unit 30 may alternatively be embodied in the form of a digital signal processor (DSP), an application specific integrated circuit (ASIC), a field-programmable gate array (FPGA), a complex programmable logic device (CPLD), etc.

The aspects of the present disclosure have mainly been described above with reference to a few embodiments and examples. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of a base station scheduling device of controlling power supply units of a base station, the method comprising:

acquiring information indicating a value of voltage input to at least one of the power supply units of the base station;

determining, from the value, if the voltage input to the at least one of the power supply units is sufficient;

in response to determining that the voltage input to the at least one of the power supply units is not sufficient:
determining power demand of the base station; and
deactivating the at least one power supply unit if remaining power supply units are capable of supplying the demanded power.

2. The method of claim 1, wherein the value is considered to be sufficient if the value exceeds an input voltage threshold value.

3. The method of claim 1, further comprising sending a request to the base station to receive the value of voltage input to at least one of the power supply units of the base station, which value is measured at the base station.

4. The method of claim 1, wherein the acquiring the information comprises receiving a value of voltage input to at least one of the power supply units of the base station, which value is measured at the base station, on a regular basis.

5. The method of claim 1, wherein the deactivating of the at least one power supply unit comprises turning the at least one power supply unit off or setting the at least one power supply unit in idle mode.

6. The method of claim 1, further comprising thereafter:
acquiring information indicating a new value of voltage input to the at least one of the power supply units of the base station;
determining from the new value if the voltage input to the at least one of the power supply units is sufficient, and if so reactivating the at least one power supply unit.

7. The method of claim 1, wherein the acquiring the information comprises estimating the value based on historical data indicating the value at a particular time of day.

8. The method of claim 1, wherein the determining of power demand of the base station comprises estimating the power demand based on historical data indicating the power demand at a particular time of day.

9. The method of claim 1, wherein the acquiring the information comprises acquiring the information using machine learning and/or statistical data.

10. A non-transitory computer readable recording medium storing a computer program product for controlling a base station scheduling device for controlling power supply units of a base station, the computer program product comprising program instructions which, when run on processing circuitry of the base station scheduling device, causes the base station scheduling device to:

acquire information indicating a value of voltage input to at least one of the power supply units of the base station;

determine, from the value, if the voltage input to the at least one of the power supply units is sufficient;

in response to determining that the voltage input to the at least one of the power supply units is not sufficient:
determine power demand of the base station; and
deactivate the at least one power supply unit if remaining power supply units are capable of supplying the demanded power.

11. The non-transitory computer readable recording medium of claim 10, wherein the program instructions are such that the base station scheduling device is operative to acquire the information by estimating the value based on historical data indicating the value at a particular time of day.

12. A base station scheduling device configured to control power supply units of a base station, the base station scheduling device comprising:
processing circuitry;
memory containing instructions executable by the processing circuitry whereby the base station scheduling device is operative to:
acquire information indicating a value of voltage input to at least one of the power supply units of the base station;
determine from the value if the voltage input to the at least one of the power supply units is sufficient;
in response to determining that the voltage input to the at least one of the power supply units is not sufficient:
determine power demand of the base station; and
deactivate the at least one power supply unit if remaining power supply units are capable of supplying the demanded power.

13. The base station scheduling device of claim 12, wherein the value is considered to be sufficient if the value exceeds an input voltage threshold value.

14. The base station scheduling device of claim 12, wherein the base station scheduling device is operative to send a request to the base station to receive the value of voltage input to at least one of the power supply units of the base station, which value is measured at the base station.

15. The base station scheduling device of claim 12, wherein the base station scheduling device is operative to, when acquiring the information:
receive a value of voltage input to at least one of the power supply units of the base station, which value is measured at the base station, on a regular basis.

16. The base station scheduling device of claim 12, wherein the base station scheduling device is operative to, when deactivating the at least one power supply unit, turn the at least one power supply unit off or set the at least one power supply unit in idle mode.

17. The base station scheduling device of claim 12, wherein the base station scheduling device is operative to:
acquire information indicating a new value of voltage input to the at least one of the power supply units of the base station;
determine from the new value if the voltage input to the at least one of the power supply units is sufficient, and if so to reactivate the at least one power supply unit.

18. The base station scheduling device of claim 12, wherein the base station scheduling device is operative to, when acquiring the information, estimate the value based on historical data indicating the value at a particular time of day.

19. The base station scheduling device of claim 12, wherein the base station scheduling device is operative to, when determining power demand of the base station, estimate the power demand based on historical data indicating the power demand at a particular time of day.

20. The base station scheduling device of claim 12, wherein the base station scheduling device is operative to acquire the information using machine learning and/or statistical data.

* * * * *